US012169005B2

(12) United States Patent
Winkler et al.

(10) Patent No.: US 12,169,005 B2
(45) Date of Patent: Dec. 17, 2024

(54) CENTERING MECHANISM WITH A BRAKE PISTON OF A DISK BRAKE

(71) Applicants: Continental Automotive Technologies GmbH, Hannover (DE); SFS Group International AG, Heerbrugg (CH)

(72) Inventors: Thomas Winkler, Frankfurt (DE); Lazar Milisic, Frankfurt (DE); Thomas Hess, Frankfurt (DE); Marijo Zach, Widnau (CH)

(73) Assignees: CONTINENTAL AUTOMOTIVE TECHNOLOGIES GMBH, Hannover (DE); SFS GROUP INTERNATIONAL AG, Heerbrugg (CH)

( * ) Notice: Subject to any disclaimer, the term of this patent is extended or adjusted under 35 U.S.C. 154(b) by 378 days.

(21) Appl. No.: 17/616,225

(22) PCT Filed: Jun. 4, 2020

(86) PCT No.: PCT/DE2020/100471
§ 371 (c)(1),
(2) Date: Dec. 3, 2021

(87) PCT Pub. No.: WO2020/244714
PCT Pub. Date: Dec. 10, 2020

(65) Prior Publication Data
US 2022/0252115 A1 Aug. 11, 2022

(30) Foreign Application Priority Data

Jun. 5, 2019 (DE) ..................... 10 2019 208 230.0
Jan. 30, 2020 (DE) ..................... 10 2020 201 142.7

(51) Int. Cl.
*F16D 55/226* (2006.01)
*F16D 65/18* (2006.01)
(Continued)

(52) U.S. Cl.
CPC ......... *F16D 55/226* (2013.01); *F16D 65/183* (2013.01); *F16H 25/2454* (2013.01);
(Continued)

(58) Field of Classification Search
CPC .... F16D 65/18; F16D 65/183; F16D 2121/14; F16D 2125/40; F16D 55/226;
(Continued)

(56) References Cited

U.S. PATENT DOCUMENTS 7,721,853 B2 * 5/2010 Chittka ................... F16D 65/18
188/162
8,733,512 B2 * 5/2014 Kim ........................ F16D 65/18
303/114.1
(Continued)

FOREIGN PATENT DOCUMENTS

WO 2019/158553 A1 8/2019

OTHER PUBLICATIONS

JP 6097841 B2 (Year: 2017).*
(Continued)

*Primary Examiner* — Robert A. Siconolfi
*Assistant Examiner* — Mahbubur Rashid
(74) *Attorney, Agent, or Firm* — Collard & Roe, P.C.

(57) ABSTRACT

A centering mechanism with a brake piston of a disk brake of a motor vehicle, with a spindle extending into a cavity in the brake piston, has dimensions that prevent a force equilibrium of a nut-spindle assembly moved completely out of the vertical position. A force vector of the gravitational force on the nut-spindle assembly extends within a contact surface between a nut and the brake piston. Thus, the brake piston can be easily assembled with the nut-spindle assembly.

6 Claims, 2 Drawing Sheets

(51) Int. Cl.
*F16H 25/24* (2006.01)
*F16D 121/14* (2012.01)
*F16D 125/40* (2012.01)
*F16D 125/66* (2012.01)

(52) U.S. Cl.
CPC ...... *F16D 2121/14* (2013.01); *F16D 2125/40* (2013.01); *F16D 2125/66* (2013.01)

(58) Field of Classification Search
CPC ...... F16D 65/46; F16D 65/52; F16D 2125/66; F16H 25/2454
See application file for complete search history.

(56) References Cited

U.S. PATENT DOCUMENTS

| | | | |
|---|---|---|---|
| 9,151,385 B2* | 10/2015 | Winkler | F16J 1/006 |
| 9,340,190 B2* | 5/2016 | Qian | B60T 11/102 |
| 9,850,971 B1* | 12/2017 | Demorais | F16D 65/18 |
| 10,060,488 B2* | 8/2018 | Lee | F16D 65/18 |
| 2010/0236877 A1* | 9/2010 | Osterlanger | F16D 65/18 |
| | | | 188/73.31 |
| 2014/0158480 A1 | 6/2014 | Qian et al. | |
| 2018/0223932 A1* | 8/2018 | Chelaidite | F16D 65/14 |
| 2018/0328430 A1* | 11/2018 | Feigel | B60T 13/746 |
| 2020/0362949 A1 | 11/2020 | Winkler et al. | |

OTHER PUBLICATIONS

KR 101747446 B1 (Year: 2017).*
EP 2464895 B1 (Year: 2018).*
DE 102017127850 A1 (Year: 2019).*
DE 102007053278 B4 (Year: 2017).*
English translation of the International Preliminary Report on Patentability and Written Opinion of the International Searching Authority in PCT/DE2020/100471, issued Dec. 16, 2021.
International Search Report in PCT/DE2020/100471, mailed Sep. 25, 2020.

* cited by examiner

CENTERING MECHANISM WITH A BRAKE PISTON OF A DISK BRAKE

CROSS REFERENCE TO RELATED APPLICATIONS

This application is the National Stage of PCT/DE2020/100471 filed on Jun. 4, 2020, which claims priority under 35 U.S.C. § 119 of German Application Nos. 10 2019 208 230.0 filed on Jun. 5, 2019 and 10 2020 201 142.7 filed on Jan. 30, 2020, the disclosures of which are incorporated by reference. The international application under PCT article 21(2) was not published in English.

BACKGROUND OF THE INVENTION

1. Field of the Invention

The invention relates to a centering mechanism having a brake piston of a disk brake of a motor vehicle, having a spindle that projects into a recess of the brake piston, having a nut that is screwed onto the spindle, and having support surfaces of the nut and of the brake piston that lie opposite one another.

2. Description of the Related Art

Brake pistons of current disk brakes are mounted in stepped bores of brake caliper housings. A large-diameter section of the stepped bore holds the brake piston, while a small-diameter section holds the spindle. The spindle is mounted in the small-diameter section so as to rotate and be axially non-displaceable. The large-diameter section allows axial displaceability of the brake piston in the brake caliper. The nut is screwed onto the spindle and is arranged in a recess within the piston.

In the case of brake pistons known from practice, a spindle/nut module is centered in the piston with shape fit. This leads to a complicated geometry of the components and to complicated assembly.

SUMMARY OF THE INVENTION

The invention is based on the problem of creating a centering mechanism of the type stated initially, which allows particularly easy assembly of brake piston and nut/spindle module in the brake caliper housing.

This problem is solved, according to the invention, in that in the case of a vertical arrangement, with the brake piston below the spindle and the nut, a force equilibrium is avoided when the nut/spindle module has been completely moved out of the vertical position.

By means of this design, the nut can first be screwed onto the spindle, and this nut/spindle module can be introduced into the recess of the brake piston vertically. Since a force equilibrium is avoided in the case of an inclined position, the nut/spindle module automatically moves back into the vertical position at all times. Avoiding the force equilibrium is achieved by means of a suitable geometry of the components. Thereby reset forces for setting the nut/spindle module back into the vertical position are generated. Thanks to the invention, the nut/spindle module can be introduced into the recess of the brake piston and can be introduced into the stepped bore of the brake caliper with the spindle in front. Canting of the components due to tilting of the nut/spindle module is avoided thanks to the invention. As a result, installation of brake piston and nut/spindle module in the brake caliper housing becomes particularly easy.

Avoidance of a force equilibrium can be structured particularly easily, in terms of design, according to another advantageous further development of the invention, if, in the case of the vertical arrangement, the distance of the center of gravity of the nut/spindle module that has been completely moved out of the vertical position from a contact plane of the support surfaces is less than half the diameter of the contact plane of the support surfaces. By means of this design, the nut/spindle module is structured in the manner of a bounce-back toy and automatically holds its vertical position. Therefore the direction of gravity of the nut/spindle module always runs within the contact plane.

The movement of the components into the intended position proves to be particularly easy in accordance with another advantageous further development of the invention, if one of the support surfaces is conical with a cone angle of at least 90°.

It contributes to reducing the friction in the case of the nut/spindle module that has been moved out of the vertical position, according to another advantageous further development of the invention, if a support surface that lies opposite the conical support surfaces is structured to be spherical, in order to produce a circumferential linear contact surface. As a result, the support surfaces have only line contact, so that friction between nut and brake piston is kept particularly low.

In the case of brake calipers of disk brakes, the geometry of the components for preventing the force equilibrium proves to be particularly simple, according to another advantageous further development of the invention, if the diameter of the contact plane of the support surfaces is greater than 15 mm. Preferably the radial play of the nut in the recess of the brake piston is less than 1 mm.

The deflection of the nut/spindle module from the vertical position can be easily restricted, according to another advantageous further development of the invention, if an outer edge of the nut, which edge faces away from the support surface, lies against the inner side of the brake piston in the position moved completely out of the vertical position. Preferably the inside diameter of the recess in the brake piston is kept particularly small, and this also contributes to slight deflection of the nut/spindle module.

A low center of gravity of the nut and thereby of the nut/spindle module can be easily ensured, according to another advantageous further development of the invention, if the outside diameter of the nut is at least as great as the distance of the outer edge of the nut, which edge faces away from the support surface, from the support surface. By means of this design, the outside diameter of the nut can be selected to be particularly large, so as to support reset forces of the nut/spindle group into the vertical position.

BRIEF DESCRIPTION OF THE DRAWINGS

The invention permits numerous embodiments. For a further clarification of its basic principle, one of these is shown in the drawing and will be described below. This drawing shows, in FIG. 1 a sectional representation through a brake caliper with a brake piston and a nut/spindle module, FIG. 2 the brake piston and the nut/spindle module from FIG. 1 during installation, FIG. 3 the brake piston and the nut/spindle module in a vertical position, FIG. 4 the brake piston and the nut/spindle module in a deflected position with force vectors.

DETAILED DESCRIPTION OF THE PREFERRED EMBODIMENTS

Figure 1:
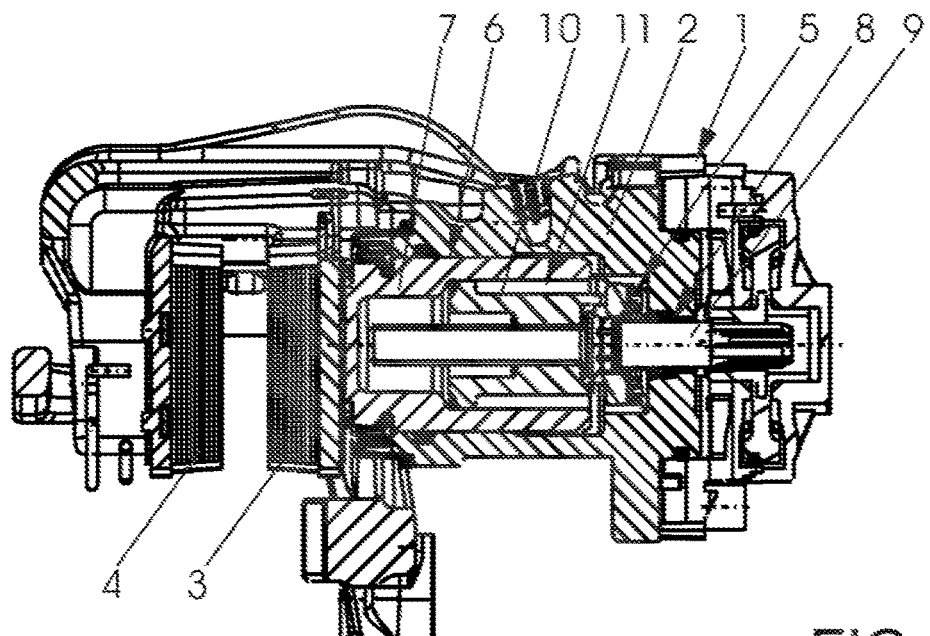

FIG. 1 shows a brake caliper 1 of a disk brake of a motor vehicle, having a brake caliper housing 2 having two brake pads 3, 4 that lie opposite one another. A brake disk of the disk brake, which is arranged between the brake pads 3, 4, is not shown. A stepped bore 5 is arranged in the brake caliper housing 2. In a large-diameter section 6 of the stepped bore 5, a brake piston 7 is arranged in axially displaceable manner. The brake piston 7 supports one of the brake pads 3. A spindle 9 is arranged in a small-diameter section 8 of the stepped bore 5. A nut 10 is screwed onto the spindle 9. The brake piston 7 has a recess 11 for holding the nut 10 and a partial region of the spindle 9.

Figure 2:
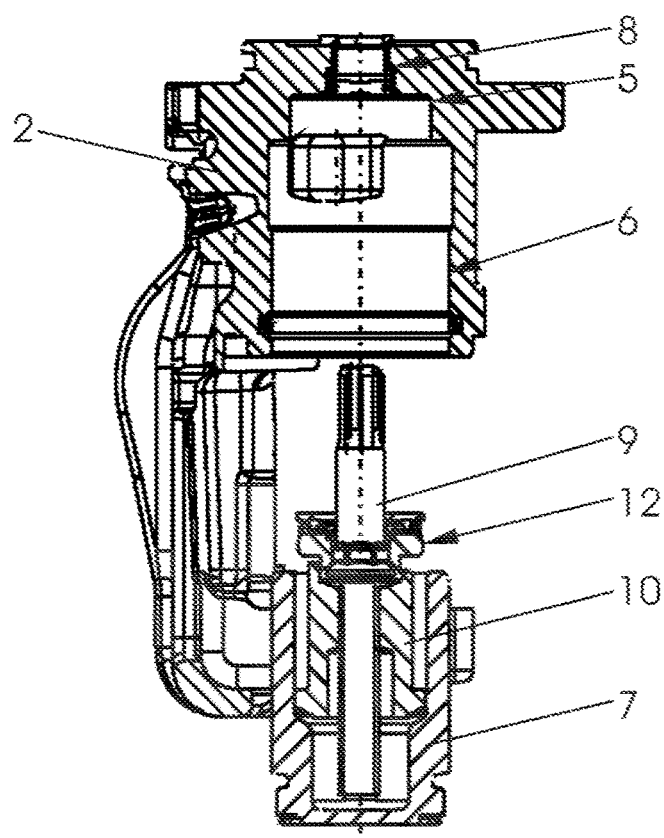

FIG. 2 shows the brake caliper housing 2 from FIG. 1 during installation of the brake piston 7 with the nut 10 and the spindle 9. The brake caliper housing 2 is in a position in which the stepped bore 5 is open downward with the large-diameter section 6. The brake piston 7 is pre-assembled with a nut/spindle module 12 for installation, and is introduced into the stepped bore 5 from below. In this regard, it is significant that the spindle 9 and thereby the nut/spindle module 12 are in the vertical and centered position relative to the brake piston 7, as shown.

Figure 3:
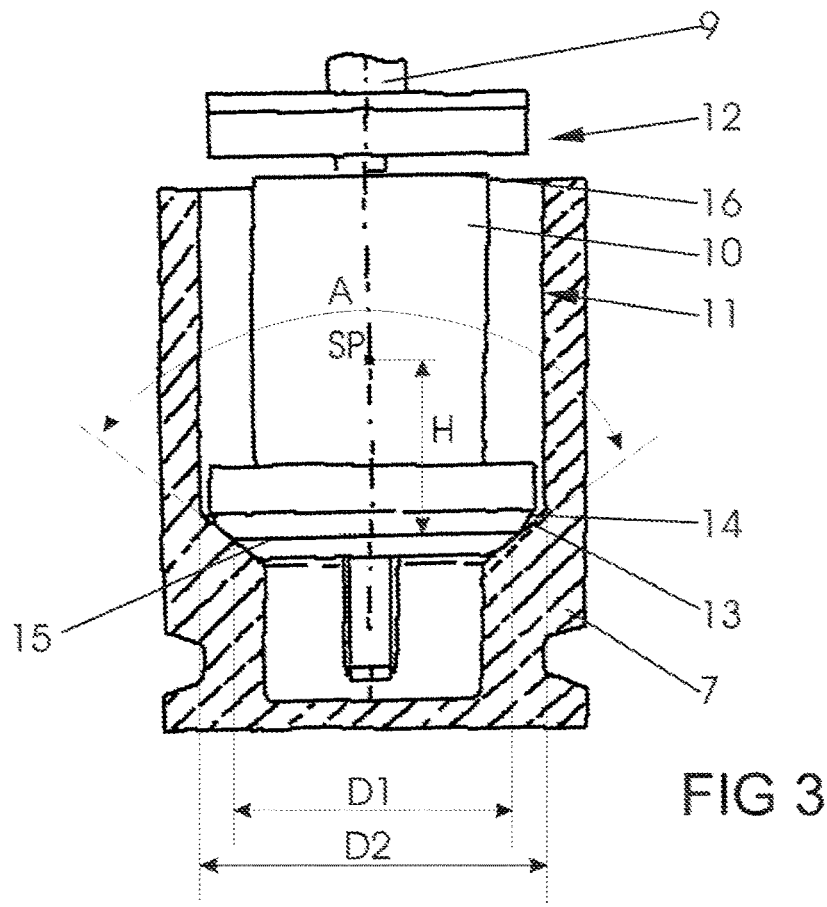

FIG. 3 shows a sectional representation of the brake piston 7, on a larger scale, in the vertical position of the nut/spindle module 12, in which the components can be introduced into the brake caliper housing 2. The nut/spindle module 12 is furthermore arranged centered in the recess 11 of the brake piston 7. The nut 10 and the brake piston 7 have support surfaces 13, 14 that lie opposite one another. The support surface 13 in the recess 11 of the brake piston 7 is structured conically, with a cone angle A of at least 90°. The support surface 14 of the nut 10 is structured spherically. As a result, a linear contact surface 15 having a diameter D1 is formed circumferentially around the nut 10. The distance H of a center of gravity SP of the nut/spindle module 12 from the contact plane formed by the contact surface 15 is less than half the diameter D1 of the contact surface 15. As a result, the force vector FG of gravity, shown in FIG. 4, always runs within the region delimited by the contact surface 15. The nut 10 is arranged almost completely within the recess 11 of the brake piston 7. Therefore an outer edge 16 of the nut 10, which faces away from the contact surface 15, makes contact with the inside of the brake piston 7 when the nut/spindle module 12 is tilted. This restricts the possible tilt tendency of the nut/spindle module 12. An outside diameter D2 of the nut 10 is at least as great as the distance of the outer edge 16 from the contact surface 14.

Figure 4:
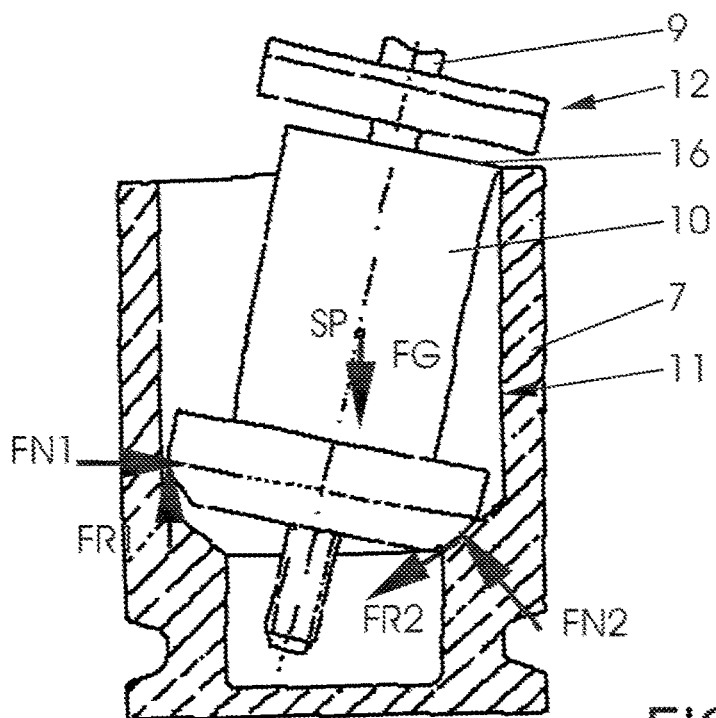

FIG. 4 shows the position of the nut/spindle module deflected out of the vertical position, with force vectors. The force vectors are designated as FN for a normal force, FR for a friction force, and FG for a weight force. In this regard, it can be recognized that in the position shown, with the nut/spindle module 12 moved out of the vertical position, no force equilibrium occurs. Instead, the weight force FG will generate a reset force that moves the nut/spindle module 12 back into the position shown in FIG. 3. This reset force is established by means of the geometries of the components, in such a manner that friction forces that are also shown are overcome.

In comparison with the position according to FIG. 3, in FIG. 4 the center of gravity of the nut/spindle module 12 has been raised due to the deflection. However, the geometries of the components as described have been established in such a manner that the reset force is sufficient for achieving the position shown in FIG. 3.

The invention claimed is:

1. A centering mechanism comprising:
a brake piston of a disk brake of a motor vehicle; and
a nut/spindle module comprising a spindle that projects into a recess of the brake piston and a nut that is screwed onto the spindle;
wherein the nut has a nut support surface and the brake piston has a brake support surface that lies opposite the nut support surface;
wherein in the case of a vertical arrangement, with the brake piston below the spindle and the nut, a force equilibrium is avoided when the nut/spindle module has been moved out of the vertical position; and
wherein the nut/spindle module has a center of gravity and in the case of the vertical arrangement, the center of gravity of the nut/spindle module moved out of the vertical position is distanced from a contact plane of the nut and brake support surfaces in an amount less than half the diameter of the contact plane of the nut and brake support surfaces.

2. The centering mechanism according to claim 1, wherein the nut support surface is conical with a cone angle of at least 90°.

3. The centering mechanism according to claim 2, wherein the brake support surface lies opposite the conical nut support surface and is structured to be spherical, in order to produce a circumferential linear contact surface.

4. The centering mechanism according to claim 1, wherein the diameter of the contact plane of the nut and brake support surfaces is greater than 15 mm.

5. The centering mechanism according to claim 1, wherein an outer edge of the nut faces away from the nut support surface and lies against an inner side of the brake piston in the position where the nut/spindle module has been moved out of the vertical position.

6. The centering mechanism according to claim 5, wherein the nut has an outside diameter at least as great as a distance of the outer edge of the nut from the brake support surface.

* * * * *